(12) United States Patent
Andrews et al.

(10) Patent No.: US 10,831,546 B2
(45) Date of Patent: Nov. 10, 2020

(54) COMPUTING TASK MANAGEMENT USING TREE STRUCTURES

(71) Applicant: Promontory Financial Group LLC, Washington, DC (US)

(72) Inventors: Joshua N Andrews, Centennial, CO (US); Thomas C Wisehart, Jr., Centennial, CO (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 151 days.

(21) Appl. No.: 15/823,395

(22) Filed: Nov. 27, 2017

(65) Prior Publication Data

US 2019/0163533 A1 May 30, 2019

(51) Int. Cl.
*G06F 9/50* (2006.01)
*G06N 20/00* (2019.01)
*G06F 9/48* (2006.01)
*G06F 16/901* (2019.01)

(52) U.S. Cl.
CPC .......... *G06F 9/5038* (2013.01); *G06F 9/4843* (2013.01); *G06F 16/9027* (2019.01); *G06N 20/00* (2019.01)

(58) Field of Classification Search
CPC ........ G06F 9/44; G06F 9/4843; G06F 9/5038; G06F 16/9027; G06N 20/00
See application file for complete search history.

(56) References Cited

U.S. PATENT DOCUMENTS

| | | | | |
|---|---|---|---|---|
| 6,678,714 B1 * | 1/2004 | Olapurath | .............. | G06Q 10/10 718/104 |
| 7,716,671 B2 * | 5/2010 | Lee | ........................ | G06Q 10/02 718/106 |
| 7,836,448 B1 * | 11/2010 | Farizon | ................. | G06F 9/4843 709/225 |
| 8,472,034 B2 * | 6/2013 | Ueda | ....................... | G06F 9/485 345/520 |
| 8,510,751 B2 * | 8/2013 | Saha | ..................... | G06F 9/5038 719/313 |
| 8,578,389 B1 * | 11/2013 | Boucher | ............... | G06F 9/4494 718/106 |
| 8,856,087 B2 * | 10/2014 | Greene | .......... | G06Q 10/063112 707/694 |
| 9,600,795 B2 * | 3/2017 | Demuth | ................. | G06Q 10/06 |

(Continued)

*Primary Examiner* — Chat C Do
*Assistant Examiner* — Douglas M Slachta
(74) *Attorney, Agent, or Firm* — Cuenot, Forsythe & Kim, LLC (57) ABSTRACT

A method, in a data processing system comprising a processor and a memory, for managing computing tasks, the method comprising retrieving, by the data processing system, data files from a corpus data server, identifying, by the data processing system, task features from the data files, creating, by the data processing system, a plurality of tasks for loading to a memory device and execution by one or more processors based on the task features, associating, by the data processing system, the plurality of tasks based on similarities of the task features, and generating, by the data processing system, mappings of the plurality of tasks based on the association, wherein the mappings include instructions for logically merging execution of the plurality of tasks.

17 Claims, 4 Drawing Sheets

(56) References Cited

U.S. PATENT DOCUMENTS

| | | | |
|---|---|---|---|
| 9,697,248 B1* | 7/2017 | Ahire | G06F 16/2365 |
| 10,318,347 B1* | 6/2019 | Wagner | G06F 9/45508 |
| 2007/0106695 A1* | 5/2007 | Miyazawa | G06F 8/70 |
| 2007/0294248 A1 | 12/2007 | Pearman | |
| 2008/0216076 A1* | 9/2008 | Udell | G01R 31/318314 |
| | | | 718/100 |
| 2008/0250227 A1* | 10/2008 | Linderman | G06F 15/167 |
| | | | 712/32 |
| 2009/0083696 A1* | 3/2009 | Blackburn | G06Q 10/06 |
| | | | 717/104 |
| 2009/0094074 A1* | 4/2009 | Nikovski | G06F 8/10 |
| | | | 705/7.27 |
| 2009/0119141 A1* | 5/2009 | McCalmont | G06Q 10/0637 |
| | | | 705/7.41 |
| 2013/0054601 A1 | 2/2013 | Whitlock et al. | |
| 2013/0054646 A1* | 2/2013 | Zizka | G06Q 10/06 |
| | | | 707/780 |
| 2014/0359563 A1* | 12/2014 | Xie | G06F 8/34 |
| | | | 717/106 |
| 2015/0160966 A1* | 6/2015 | Archer | G06F 9/5066 |
| | | | 718/102 |
| 2016/0019090 A1* | 1/2016 | Kuromatsu | G06F 9/5038 |
| | | | 718/102 |
| 2016/0179581 A1* | 6/2016 | Soundararajan | G06F 9/5033 |
| | | | 718/104 |
| 2018/0182136 A1* | 6/2018 | Zeyl | G06F 9/5027 |
| 2018/0293108 A1* | 10/2018 | Tang | G06F 9/5027 |
| 2019/0065275 A1* | 2/2019 | Wong | H04L 67/1034 |
| 2020/0050853 A1* | 2/2020 | Alexander | G06K 9/00456 |

* cited by examiner

COMPUTING TASK MANAGEMENT USING TREE STRUCTURES

BACKGROUND

The present invention generally relates to computer processing, and in particular, to consolidating a group of related tasks to perform fewer data operations or data operations in fewer clock cycles.

Organizations are typically subject to a large number of computer processing, for example, to satisfy task requirements. It is not uncommon that the processes imposed by task requirements overlap. Current systems do not associate tasks in a manner that enables organizations to satisfy multiple task requirements with a single task execution. Rather, the current systems may lead the organizations to duplicate their task executions, which leads to waste of resources. Thus, there is a need for a system for consolidating computing tasks so as to allow organizations to perform a single or reduced number of tasks to satisfy multiple task requirements.

SUMMARY

Methods, computing systems, and computer program products for managing computing tasks are disclosed. According to one embodiment, said method is in a data processing system comprising a processor and a memory. Said method comprises retrieving, by said data processing system, data files from a corpus data server. Task features are identified from said data files by said data processing system. A plurality of tasks are created by said data processing system for loading to a memory device and execution by one or more processors based on said task features. Said plurality of tasks are associated by said data processing system based on similarities of said task features. Said method further comprises generating, by said data processing system, mappings of said plurality of tasks based on said association, wherein said mappings include instructions for logically merging execution of said plurality of tasks.

Said data files may include content selected from the group consisting of: regulations, policies, obligations, and guidance. In one embodiment, identifying said task features further comprises extracting, by said data processing system, task requirements associated with said plurality of tasks. Said task features may include input, output, and parameters for said plurality of tasks. Identifying said task features may further comprise identifying, by said data processing system, said task features by using machine learning or natural language processing. Said method may further comprise transmitting, by said data processing system, said plurality of tasks to a computing device.

In another embodiment, associating said plurality of tasks further comprises determining, by said data processing system, similarity of task requirements of said plurality of tasks. Associating said plurality of tasks may further comprise linking, by said data processing system, said plurality of tasks in tree data structures. Said mappings may include a plurality of nodes and links that connect said plurality of nodes, said plurality of nodes are representative of said plurality of tasks and said links are representative of relationships between said plurality of tasks. Generating mappings of said plurality of tasks may further comprise determining, by said data processing system, a first task having more rigorous task requirements in relation to a second task, and arranging, by said data processing system, said first task as a parent node in relation to a node representative of said second task based on said determination.

According to one embodiment, said computing system comprises a computer processor and a computer memory operatively coupled to said computer processor. Said computer memory having disposed within it computer program instructions that, when executed by said processor, cause said computing system to carry out the step of retrieving data files from a corpus data server. Said processor may also identify task features from said data files. Said processor may create a plurality of tasks for loading to a memory device and execution by one or more processors based on said task features. Said processor may associate said plurality of tasks based on similarities of said task features. Said processor may further generate mappings of said plurality of tasks based on said association, wherein said mappings include instructions for logically merging execution of said plurality of tasks.

Said data files may include content selected from the group consisting of: regulations, policies, obligations, and guidance. Said processor identifying said task features may further comprise said processor identifying said task features by using machine learning or natural language processing. Said processor associating said plurality of tasks may further comprise said processor linking said plurality of tasks in tree data structures. In one embodiment, said mappings may include a plurality of nodes and links that connect said plurality of nodes, said plurality of nodes are representative of said plurality of tasks and said links are representative of relationships between said plurality of tasks. In another embodiment, said processor generating mappings of said plurality of tasks further comprises said processor determining a first task having more rigorous task requirements in relation to a second task, and arranging said first task as a parent node in relation to a node representative of said second task based on said determination.

According to one embodiment, said computer program product comprises a computer readable storage medium having stored thereon program instructions executable by a processing device to cause said processing device to retrieve data files from a corpus data server. Said computer program product further comprises program instructions executable by said processing device to cause said processing device to identify task features from said data files. Said computer program product further comprises program instructions executable by said processing device to cause said processing device to create a plurality of tasks for loading to a memory device and execution by one or more processors based on said task features. Said computer program product further comprises program instructions executable by said processing device to cause said processing device to associate said plurality of tasks based on similarities of said task features. Said computer program product further comprises program instructions executable by said processing device to cause said processing device to generate mappings of said plurality of tasks based on said association, wherein said mappings include instructions for logically merging execution of said plurality of tasks.

Said program instructions executable by said processing device to cause said processing device to identify said task features may further comprise program instructions executable by said processing device to cause said processing device to identify said task features by using machine learning or natural language processing. In one embodiment, said mappings may include a plurality of nodes and links that connect said plurality of nodes, said plurality of nodes are representative of said plurality of tasks and said links are representative of relationships between said plurality of tasks. In another embodiment, said program instructions executable by said processing device to cause said processing device to generate mappings of said plurality of tasks further comprises program instructions executable by said processing device to cause said processing device to determine a first task having more rigorous task requirements in relation to a second task, and program instructions executable by said processing device to cause said processing device to arrange said first task as a parent node in relation to a node representative of said second task based on said determination.

DETAILED DESCRIPTION

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the present invention. Likewise, a reasonably broad scope for claimed or covered subject matter is intended. Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Exemplary methods, computer systems, and products for managing computing tasks using tree data structures in accordance with the present invention are described with reference to the accompanying drawings. Tasks to accomplish certain results or requirements may be executed to simultaneously accomplish other results or requirements that have similar features. For example, actions to comply with certain obligations may be utilized to satisfy other types of obligations that are similar in scope. Tasks may be associated or clustered and arranged into a hierarchical tree data structure or in undirected graph relationships such that a computing task, such as a compliance action, that satisfies a principal task requirement at a parent node can also satisfy children or sibling node-related task requirements (nodes).

Figure 1:
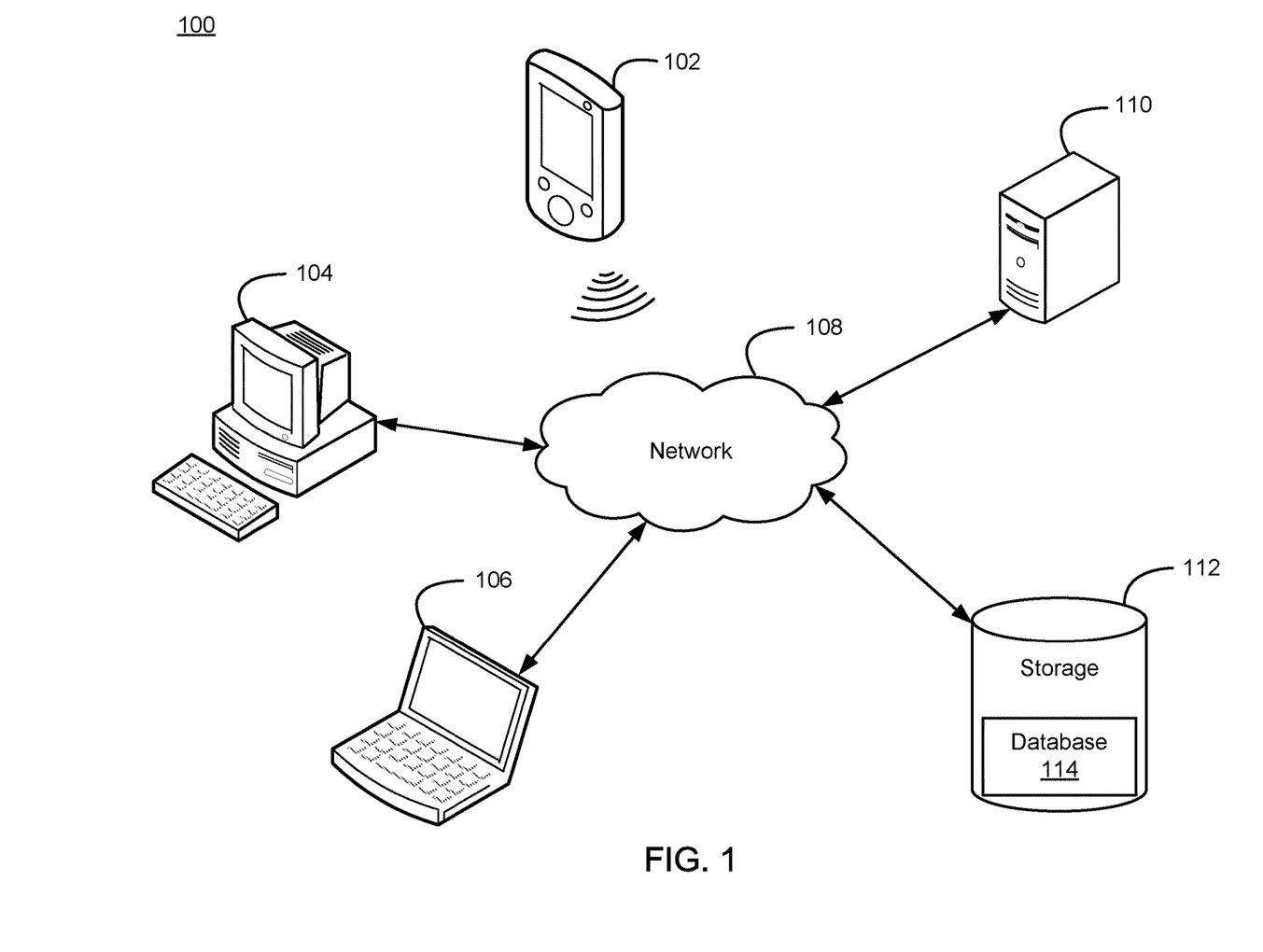
FIG. 1 illustrates a computing system according to an embodiment of the present invention.

Referring now to FIG. 1, illustrative computing environment 100 is depicted. As shown, computing environment 100 includes one or more computing devices, such as, for example, personal digital assistant (PDA) or cellular telephone 102, desktop computer 104, and/or laptop computer 106. Any of the computing devices may communicate with a server 110 and storage 112 over network 108 using wired or wireless communication technologies. Server 110 is operative to receive requests from the computing device, retrieve data from database 114 (stored in storage 112), and process the requests and the retrieved data to generate responses to the computing devices across the network 108. Servers, as described herein, may vary widely in configuration or capabilities but are comprised of at least a special-purpose digital computing device including at least one or more central processing units and memory. A server may also include one or more of mass storage devices, power supplies, wired or wireless network interfaces, input/output interfaces, and operating systems, such as Windows Server, Mac OS X, Unix, Linux, FreeBSD, or the like. It is understood that the types of computing devices shown in FIG. 1 are intended to be illustrative only and that any type of computerized device can communicate with server 110 over any type of network and/or network addressable connection (e.g., using a web browser).

Network 108 may be any suitable type of network allowing transport of data communications across thereof. Network 108 may support many data communications protocols, including for example TCP (Transmission Control Protocol), IP (Internet Protocol), HTTP (Hypertext Transfer Protocol), WAP (Wireless Access Protocol), HDTP (Handheld Device Transport Protocol), and others as will occur to those of skill in the art. The network 108 may couple devices so that communications may be exchanged, such as between server 110 and client devices (e.g., cellular telephone 102, desktop computer 104, and/or laptop computer 106) or other types of devices, including between wireless devices coupled via a wireless network, for example. A network may also include mass storage, such as network attached storage (NAS), a storage area network (SAN), cloud computing and storage, or other forms of computer or machine-readable media, for example. In one embodiment, the network may be the Internet, following known Internet protocols for data communication, or any other communication network, e.g., any local area network (LAN) or wide area network (WAN) connection, cellular network, wire-line type connections, wireless type connections, or any combination thereof. Communications and content stored and/or transmitted to and from client devices and servers may be encrypted using, for example, the Advanced Encryption Standard (AES) with a 128, 192, or 256-bit key size, or any other encryption standard known in the art.

Figure 2:
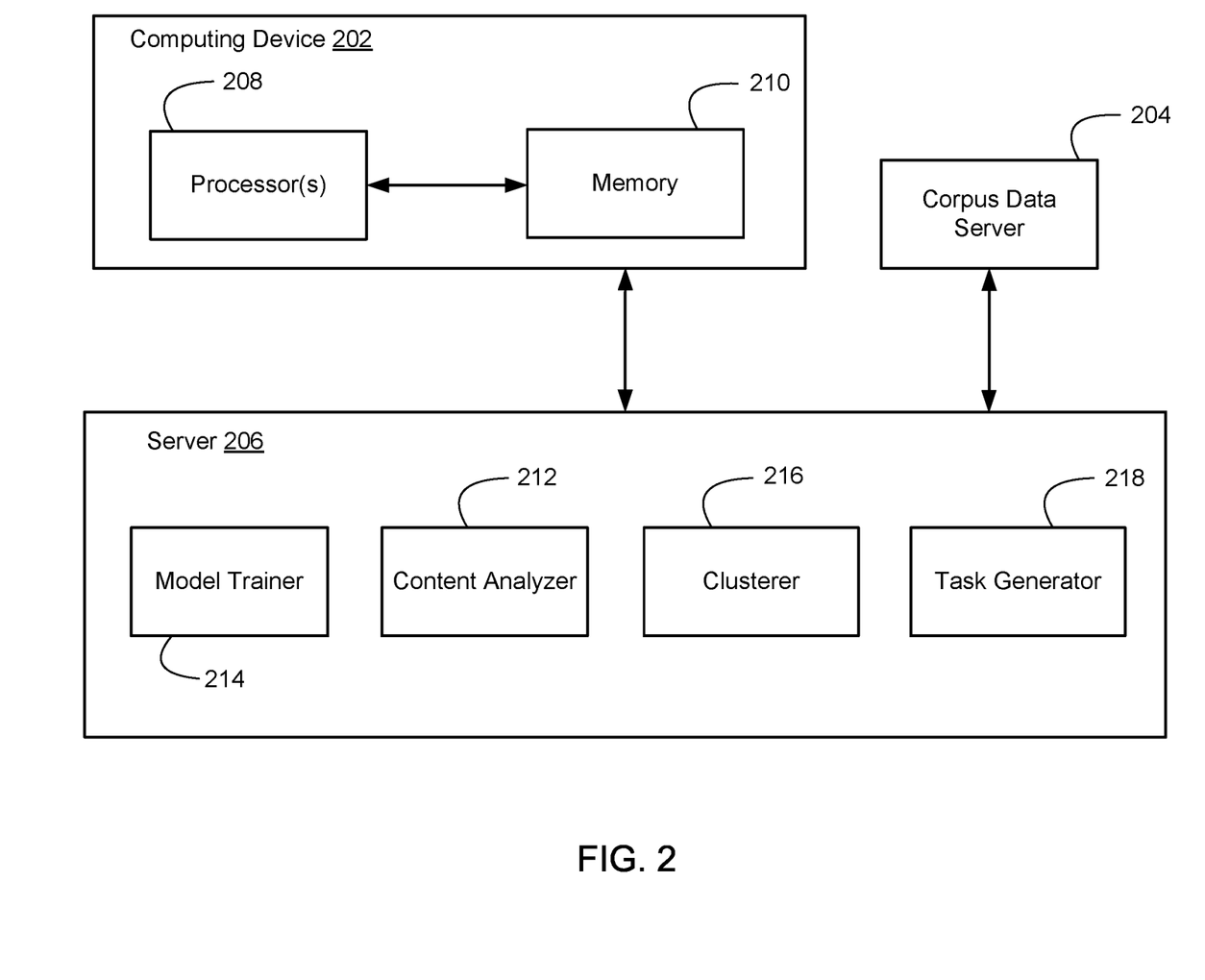
FIG. 2 illustrates another computing system according to an embodiment of the present invention.

FIG. 2 presents a logical block diagram of a data processing system for managing computing tasks according to one embodiment of the present invention. The present invention is not limited to the arrangement of devices in the exemplary system illustrated in FIG. 2, but rather are for explanation. Data processing systems useful according to various embodiments of the present invention may include additional servers, routers, other devices, and peer-to-peer architectures, not shown in FIG. 2, as understood by those of skill in the art.

The illustrated system includes computing device 202, corpus data server 204, and server 206. Computing device 202 may comprise devices, such as desktop computers, television devices, terminals, laptops, personal digital assistants (PDA), cellular phones, smartphones, tablet computers, or any computing device having a central processing unit and memory unit. The computing device 202 may include one or more processors 208 and memory 210. The processors 208 may be of any type including but not limited to a microprocessor, a microcontroller, a digital signal processor, or any combination thereof. Processors 208 may include one more levels of caching, such as a level one cache and a level two cache, a processor core, and registers. The one or more processors 208 may be configured to be in communication with memory 210 to fetch or receive tasks and instructions for executing the tasks. According to one embodiment, the one or more processors 208 communicate with memory 210 via a communications interface, bus, or channel. Memory 210 may comprise a local memory or storage device that is capable of being read and written to, such as random-access memory (RAM).

Server 206 includes at least one computer processor or CPU as well as RAM which may be connected through a high-speed memory bus and bus adapter to the processor and to other components of the server. Stored in RAM, or a hard drive connected to the RAM, may be a content analyzer 212 including computer program instructions that when executed, cause the computer to perform analysis of the data files in corpus data server 204. Corpus data server 204 may comprise one or more computing devices, either local or remote, that are operable to provide structured and unstructured data in files, such as documents, tables, charts, illustrations, photographs, etc., and the structured and unstructured data further includes text, characters, and numbers. Analyzing the data files in corpus data server 204 may include identifying task features. For example, a given file may comprise a specification including one or more regulations, policies, obligations, guidance, etc., that may be analyzed by content analyzer 212 to create tasks with task requirements for compliance in accordance with the specification.

According to one embodiment, the content analyzer 212 may comprise an artificial intelligence unit trained by model trainer 214 (e.g., using machine learning techniques such as support vector machines, neural networks, clustering, decision tree learning, etc.) to identify task features from elements, such as, terms and phrases, of the data files from corpus data server 204. In another embodiment, content analyzer 212 may also parse the data files through natural language processing ("NLP") to determine task features, such as task requirements (e.g., related to compliance with regulations, policies, obligations, guidance, etc.). NLP can be used to analyze text in combination with machine-learning to facilitate understanding of human languages by a computer. Alternatively, or in combination with NLP, content analyzer 212 may analyze metadata or tags found in corpus data server 204 that are representative of the content and task features contained in the data files.

The analysis of the data files from corpus data server 204 may identify tasks and respective task requirements for task generator 218 to create. Task generator 218 may create the tasks with the task requirements and transmit them to computing device 202. The tasks and task requirements transmitted to computing device 202 may be loaded to memory 210 for retrieval by the one or more processors 208 to execute.

Memory 210 may further include mappings that may be referenced to execute the tasks more efficiently by consolidating the tasks or the execution of the tasks. Mappings may instruct the one or more processors 208 how to execute the tasks based on their requirements. The mappings may be created by clusterer 216 by analyzing the features (e.g., details and requirements) of the tasks in memory 210 and associating similar or related tasks. For example, clusterer 216 may associate tasks by determining that task requirements are equivalent or similar among a plurality of tasks.

Associating the similar or related tasks may include linking the tasks in tree structures or undirected graphs. Tasks that share a degree of similarity or relationship may be linked accordingly. Mappings may include nodes and links connecting the nodes. Nodes may represent tasks and task requirements and the links may represent relationships among the concepts of the tasks and task requirements. For example, tasks (e.g., obligations) are associated into tree data structures, in which the tasks may be first grouped into similar subject and then arranged in a manner such that the task having more rigorous task requirements (e.g., compliance) are placed as a parent node to those having more moderate task requirements. In another embodiment, the system allows customizations of the tree data structure to create additional relationships, such as undirected graph relationships between sibling nodes, so that a task in a sibling node can satisfy the sibling-related tasks.

As such, the mappings may be used to generate consolidated tasks from tasks in memory 210 to satisfy a plurality of task requirements. That is, a consolidated task may be a single task that can satisfy requirements of a plurality of tasks. For example, the consolidated task may include multiple smaller tasks for execution to satisfy a principal task requirement, and by extension, child and sibling task requirements according to their nodal links to the principal task requirement based on the mappings. A consolidated task may include elements (e.g., subroutines, functions, methods, threads, etc.) of one or more individual processes for the one or more processors 208 to execute as a single task. The elements may be performed as smaller tasks that are executed sequentially, simultaneously, or a combination therefore.

Figure 3:
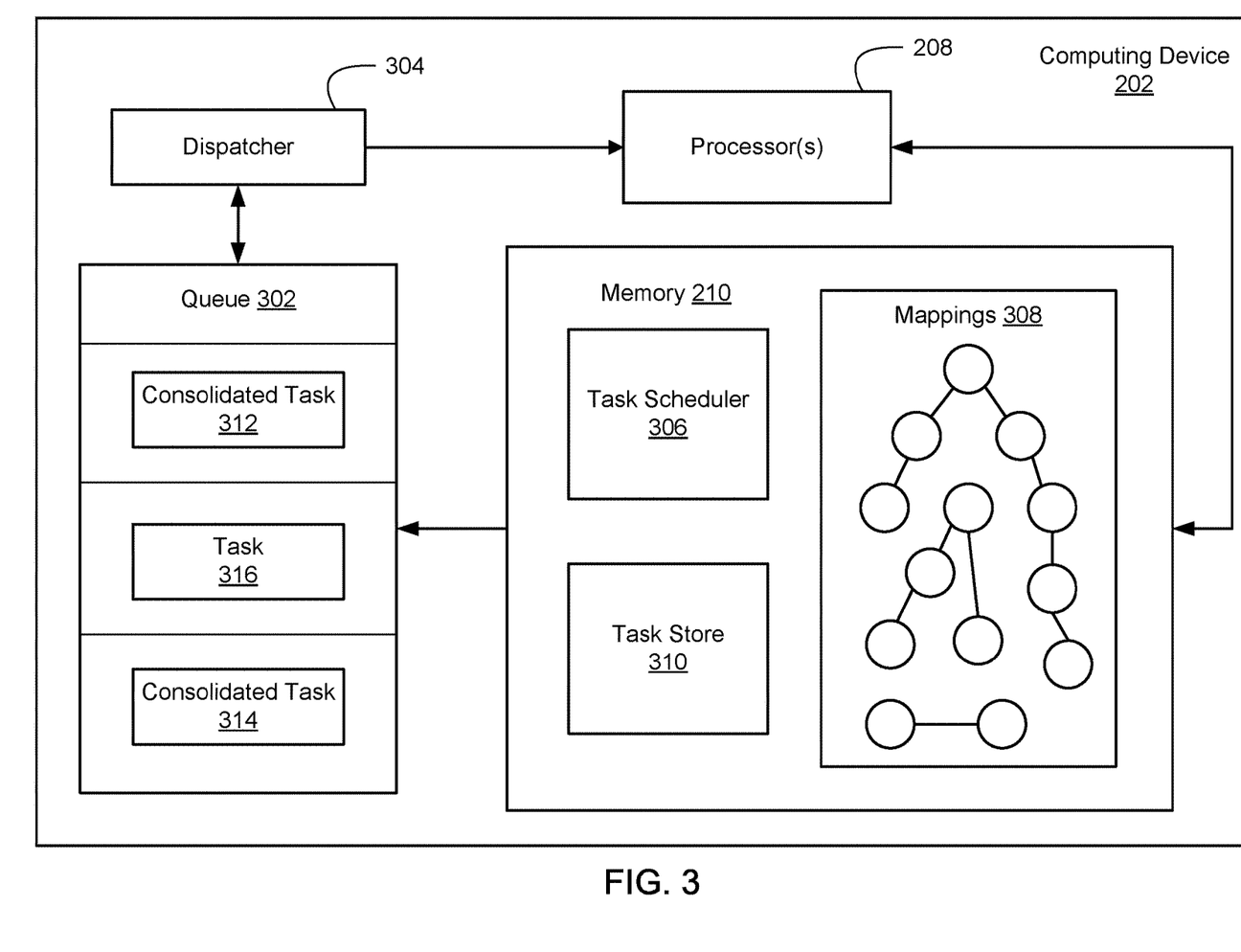
FIG. 3 illustrates processing components according to an embodiment of the present invention.

FIG. 3 presents processing components of a computing device according to an embodiment of the present invention. The computing device 202 may comprise one or more processors 208, memory 210, queue 302, and dispatcher 304. The one or more processors 208 is operable to communicate with memory 210 via a communication interface, bus or channel to perform data operations with memory 210, including reading and writing data. Memory 210 may include task scheduler 306, mappings 308, and task store 310. The memory 210 may be loaded with data and instructions for processing by the one or more processors 208. The data and instructions may comprise tasks stored to task store 310 and associations stored to in mappings 308. Task store 310 may contain a plurality of tasks received from a task source, such as from a server or user input via a graphical user interface. Mappings 308 may include data structures, such as linked lists, arrays, hash tables, or graphs, which specify associations between tasks in task store 310.

With the data and instructions in memory, the one or more processors 208 may communicate with task scheduler 306 to push tasks from task store 310 to queue 302. Task scheduler 306 may also reference mappings 308 to determine which tasks in task store 310 may be consolidated and pushed to queue 302 as consolidated tasks. Consolidated tasks may be created by logically merging tasks from task store 310 that are associated based on instructions in mappings 308. In the illustrated example, queue 302 includes consolidated task 312, consolidated task 314, and task 316 (a single task with no associations to other tasks). Dispatcher 304 can pop the tasks from queue 302 for execution by the one or more processors 208.

Figure 4:
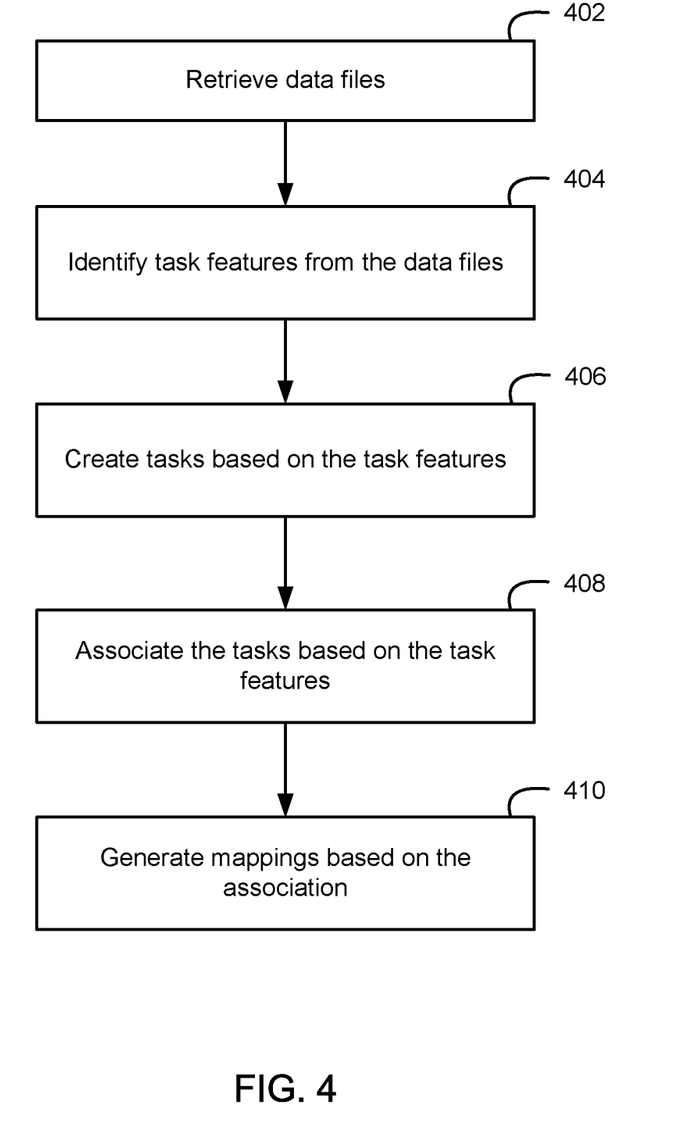
FIG. 4 illustrates a flowchart of a method for managing computing tasks according to an embodiment of the present invention.

FIG. 4 presents a flowchart of a method for managing computing tasks according to an embodiment of the present invention. Data files are retrieved, step 402. The data files may be retrieved from corpus data servers and include content such as regulations, policies, obligations, guidance, etc. Exemplary data files include documents, tables, charts, illustrations, photographs, etc., and may contain text, characters, and numbers.

Task features are identified from the data files, step 404. A given data file may comprise a specification that may be analyzed to identify task features. Identifying the task features may include extracting tasks and task requirements for compliance in accordance with the specification. The task features may include details and requirements for performing tasks, such as input, output, parameters, and other task criteria. Task features may be identified by using techniques such as machine learning and/or NLP to identify task features from elements, such as, terms and phrases, of the data files. Tasks are created based on the task features, step 406. Identification of task features may determine tasks with respective task requirements to create. The created tasks may be transmitted to a computing device and/or loaded to a memory device for retrieval by one or more processors to execute.

The tasks are associated based on the task features, step 408. Tasks may be associated into data structures, such as trees and graphs, in which the tasks can be grouped based on similar subject matter. For example, tasks may be associated by a determination that the features of more than one task are equivalent or similar. The association of the tasks may be used to determine tasks with certain requirements that may be executed to simultaneously satisfy other tasks with similar requirements. Associating the similar or related tasks may include linking the tasks in the data structures. Tasks that share a degree of similarity or relationship may be linked accordingly.

Mappings of the tasks are generated based on the association, step 410. The mappings may include data structures, such as linked lists, arrays, hash tables, or graphs, which specify associations between the created tasks. Mappings may include nodes and links connecting the nodes. Nodes may represent tasks and task requirements and the links may represent relationships among the concepts of the tasks and task requirements. The tasks may be further arranged in a manner such that, for example, tasks having more rigorous task requirements are placed as a parent node to those having more moderate (or common) task requirements. Determining a parent node with rigorous task requirements may include determining if a node may be classified as a superset of other nodes or having more requirements in addition to a set of common requirements. In another embodiment, the data structures may be customized to create additional relationships such as undirected graph relationships between sibling nodes, so that a task in a sibling node can satisfy the sibling-related tasks. The mappings can be used to instruct processors how to execute the tasks based on their associations. Associations in the mappings may be referenced for instructions to execute the created tasks more efficiently by logically consolidating similar tasks or execution of similar tasks such that the tasks may be performed using fewer data operations or in fewer clock cycles.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIGS. 1 through 4 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory, for managing computing tasks, the method comprising:
    retrieving, by the data processing system, data files from a corpus data server;
    identifying, by the data processing system, task features from the data files;
    creating, by the data processing system, a plurality of tasks for loading to a memory device and execution by one or more processors based on the task features;
    associating, by the data processing system, the plurality of tasks based on similarities of the task features; and
    generating, by the data processing system, mappings of the plurality of tasks based on the association,
    wherein the mappings include a plurality of nodes and links that connect the plurality of nodes, the plurality of nodes are representative of the plurality of tasks and the links are representative of relationships between the plurality of tasks, and
    wherein the mappings include instructions for logically merging execution of the plurality of tasks.

2. The method of claim 1 wherein the data files include content selected from the group consisting of:
    regulations, policies, obligations, and guidance.

3. The method of claim 1 wherein identifying the task features further comprises extracting, by the data processing system, task requirements associated with the plurality of tasks.

4. The method of claim 1 wherein the task features include input, output, and parameters for the plurality of tasks.

5. The method of claim 1 wherein identifying the task features further comprises identifying, by the data processing system, the task features by using machine learning or natural language processing.

6. The method of claim 1 further comprising transmitting, by the data processing system, the plurality of tasks to a computing device.

7. The method of claim 1 wherein associating the plurality of tasks further comprises determining, by the data processing system, similarity of task requirements of the plurality of tasks.

8. The method of claim 1 wherein associating the plurality of tasks further comprises linking, by the data processing system, the plurality of tasks in tree data structures.

9. The method of claim 1 wherein generating mappings of the plurality of tasks further comprises:
   determining, by the data processing system, a first task having more rigorous task requirements in relation to a second task; and
   arranging, by the data processing system, the first task as a parent node in relation to a node representative of the second task based on the determination.

10. A computing system for managing computing tasks, the computing system comprising a computer processor and a computer memory operatively coupled to the computer processor, the computer memory having disposed within it computer program instructions that, when executed by the processor, cause the computing system to carry out the steps of:
   retrieving data files from a corpus data server;
   identifying task features from the data files;
   creating a plurality of tasks for loading to a memory device and execution by one or more processors based on the task features;
   associating the plurality of tasks based on similarities of the task features; and
   generating mappings of the plurality of tasks based on the association,
   wherein the mappings include a plurality of nodes and links that connect the plurality of nodes, the plurality of nodes are representative of the plurality of tasks and the links are representative of relationships between the plurality of tasks, and
   wherein the mappings include instructions for logically merging execution of the plurality of tasks.

11. The system of claim 10 wherein the data files include content selected from the group consisting of:
   regulations, policies, obligations, and guidance.

12. The system of claim 10 wherein the processor identifying the task features further comprises the processor identifying the task features by using machine learning or natural language processing.

13. The system of claim 10 wherein the processor associating the plurality of tasks further comprises the processor linking the plurality of tasks in tree data structures.

14. The system of claim 10 wherein the processor generating mappings of the plurality of tasks further comprises the processor:
   determining a first task having more task requirements in relation to a second task; and
   arranging the first task as a parent node in relation to a node representative of the second task based on the determination.

15. A computer program product for managing computing tasks, the computer program product comprising:
   a computer readable storage medium having stored thereon:
   program instructions executable by a processing device to cause the processing device to retrieve data files from a corpus data server;
   program instructions executable by the processing device to cause the processing device to identify task features from the data files;
   program instructions executable by the processing device to cause the processing device to create a plurality of tasks for loading to a memory device and execution by one or more processors based on the task features;
   program instructions executable by the processing device to cause the processing device to associate the plurality of tasks based on similarities of the task features; and
   program instructions executable by the processing device to cause the processing device to generate mappings of the plurality of tasks based on the association,
   wherein the mappings include a plurality of nodes and links that connect the plurality of nodes, the plurality of nodes are representative of the plurality of tasks and the links are representative of relationships between the plurality of tasks, and
   wherein the mappings include instructions for logically merging execution of the plurality of tasks.

16. The computer program product of claim 15 wherein the program instructions executable by the processing device to cause the processing device to identify the task features further comprises the program instructions executable by the processing device to cause the processing device to identify the task features by using machine learning or natural language processing.

17. The computer program product of claim 15 wherein the program instructions executable by the processing device to cause the processing device to generate mappings of the plurality of tasks further comprises:
   program instructions executable by the processing device to cause the processing device to determine a first task having more task requirements in relation to a second task; and
   program instructions executable by the processing device to cause the processing device to arrange the first task as a parent node in relation to a node representative of the second task based on the determination.

* * * * *